US 10,807,205 B2

(12) United States Patent
Kschier et al.

(10) Patent No.: US 10,807,205 B2
(45) Date of Patent: Oct. 20, 2020

(54) MACHINE TOOL FOR MACHINING A WORKPIECE

(71) Applicant: DECKEL MAHO PFRONTEN GMBH, Pfronten (DE)

(72) Inventors: Uwe Kschier, Füssen (DE); Alfred Geissler, Pfronten (DE)

(73) Assignee: DECKEL MAHO PFRONTEN GMBH, Pfronten (DE)

( * ) Notice: Subject to any disclaimer, the term of this patent is extended or adjusted under 35 U.S.C. 154(b) by 230 days.

(21) Appl. No.: 15/739,417

(22) PCT Filed: Jun. 22, 2016

(86) PCT No.: PCT/EP2016/064428
§ 371 (c)(1),
(2) Date: Dec. 22, 2017

(87) PCT Pub. No.: WO2016/207223
PCT Pub. Date: Dec. 29, 2016

(65) Prior Publication Data
US 2018/0290249 A1 Oct. 11, 2018

Related U.S. Application Data

(60) Provisional application No. PCT/EP2016/064428, filed on Jun. 22, 2016.

(30) Foreign Application Priority Data

Jun. 22, 2015 (DE) .................. 10 2015 211 496

(51) Int. Cl.
*B25J 9/00* (2006.01)
*B23Q 1/54* (2006.01)
(Continued)

(52) U.S. Cl.
CPC .......... *B23Q 1/5481* (2013.01); *B25J 9/0096* (2013.01); *B25J 9/046* (2013.01); *B25J 11/005* (2013.01); *Y10S 901/25* (2013.01); *Y10S 901/28* (2013.01)

(58) Field of Classification Search
CPC ... B25J 9/06; B25J 9/042; B25J 9/1035; B25J 9/1045; B25J 9/0096; B25J 9/046; B25J 11/005; B23Q 1/5481
See application file for complete search history.

(56) References Cited

U.S. PATENT DOCUMENTS 2,747,437 A * 5/1956 Garrand ............... B23Q 1/5481
82/19
4,239,431 A * 12/1980 Davini ................ B05B 13/0431
118/323
(Continued)

FOREIGN PATENT DOCUMENTS

DE          2624378 A1    2/1977
DE       100 19 256 A1    1/2001
(Continued)

OTHER PUBLICATIONS

Apr. 16, 2016 Office Action issued in German Patent Application No. 10 2015 211 496.1.
(Continued)

*Primary Examiner* — Zaharia Elahmadi
(74) *Attorney, Agent, or Firm* — Oliff PLC

(57) ABSTRACT

A machine tool for machining a workpiece has a spindle arm with a spindle for receiving a tool or workpiece. The spindle arm is movably attached to a spindle arm receiving section. The spindle arm has a first spindle arm section, being a longitudinal element, having a first rotational axis with respect to the spindle arm receiving section and is hinged to the spindle arm receiving section; a second spindle arm section, rotatable about a second rotational axis with respect (Continued)

to and is hinged to the first. The spindle arm receiving section has a first subsection and a second subsection, arranged on the machine column at a distance from one another to receive the spindle arm. The first spindle arm section has first and second subsections, which are arranged on the spindle arm receiving section at a distance from each other to receive the second spindle arm section.

12 Claims, 19 Drawing Sheets

(51) Int. Cl.
  *B25J 9/04* (2006.01)
  *B25J 11/00* (2006.01)

(56) References Cited

U.S. PATENT DOCUMENTS

| | | | |
|---|---|---|---|
| 4,685,861 A | | 8/1987 | Huetsch |
| 4,693,665 A | * | 9/1987 | Friederichs ............... B25J 9/046 188/72.4 |
| 4,741,078 A | | 5/1988 | Kimura |
| 7,470,095 B2 | | 12/2008 | Brunemann |
| 7,857,558 B2 | | 12/2010 | Schrott |
| 8,998,654 B2 | | 4/2015 | Donhauser et al. |
| 2002/0094265 A1 | * | 7/2002 | Momoki ................... B25J 9/042 414/744.5 |
| 2005/0065654 A1 | * | 3/2005 | Hariki .................... B25J 9/0096 700/245 |
| 2006/0228182 A1 | * | 10/2006 | Pasquetto ................. B23Q 1/44 409/201 |
| 2007/0059116 A1 | | 3/2007 | Brunemann |
| 2008/0078075 A1 | | 4/2008 | Schrott |
| 2013/0196552 A1 | | 8/2013 | Donhauser et al. |
| 2017/0095936 A1 | * | 4/2017 | Fukuoka ................ B25J 9/0009 |

FOREIGN PATENT DOCUMENTS

| | | |
|---|---|---|
| DE | 10 2005 043 835 A1 | 3/2007 |
| EP | 0063702 A1 | 11/1982 |
| EP | 0178944 A1 | 4/1986 |
| EP | 0233625 A1 | 8/1987 |
| EP | 1188511 A2 | 3/2002 |
| EP | 1892055 B1 | 7/2009 |
| EP | 2529910 A1 | 12/2012 |
| FR | 2921577 A1 | 4/2009 |
| JP | H02-256408 A | 10/1990 |
| JP | H04-269139 A | 9/1992 |
| WO | 86/06673 A1 | 11/1986 |
| WO | 03/084721 A2 | 10/2003 |
| WO | 2005/002786 A1 | 1/2005 |

OTHER PUBLICATIONS

Feb. 1, 2017 International Search Report issued in International Patent Application No. PCT/EP2016/064428.
Mar. 14, 2019 Translation of First Office Action issued in Chinese Patent Application No. 201680036957.9.
Sep. 18, 2019 Translation of Second Office Action issued in Chinese Patent Application No. 201680036957.9.
Mar. 26, 2019 Translation of Office Action issued in Japanese Patent Application No. 2017-566310.
May 29, 2020 Office Action issued in Indian Patent Application No. 201737046015.

* cited by examiner

MACHINE TOOL FOR MACHINING A WORKPIECE

The present invention relates to a machine tool for machining a workpiece, comprising a spindle arm with a spindle for receiving a tool or the workpiece, said spindle arm for positioning the spindle in a processing area being movably attached to a spindle arm receiving section that is arranged on a machine column.

BACKGROUND OF THE INVENTION

The prior art discloses machine tools for machining workpieces, said machine tools combining pivoting movements of the spindle with linear traveling movements of the spindle.

EP 1 188 511 A2 describes a machine tool for machining workpieces, comprising a tool slide which can be moved on/along a machine column by means of a motor and serves as a carrier for a processing unit having at least one work spindle and a workpiece carrier for receiving the workpieces to be processed. The tool slide contains a transverse support which is movably guided on/along the machine column and has two cross slides which are slidable in the longitudinal direction thereof by means of a motor and between which the processing unit is arranged in hinged fashion via a coupling mechanism on at least two dimensionally stable pivot arms for the axial movement of the work spindle.

Due to the restricted mobility of the spindle, these machines are not suitable for traveling over angular or curved workpiece surfaces.

In the case of multi-section, elongated and thus torsion-susceptible pivot arms having a relatively large reach, the problem is to transmit the torques required for the pivoting movements in such a way that the positioning accuracy of the spindle does not suffer and to simultaneously select a design which can absorb the forces occurring during machining.

SUMMARY OF THE INVENTION

Therefore, an object of the present invention is to provide a machine tool for machining a workpiece, by means of which the torques for the rotational movements of the individual spindle arm sections can be transmitted in such a way that the spindle at the end of the spindle arm is positioned with high precision.

Furthermore, an object of the present invention is to provide a machine tool, by means of which the largest possible part of the workpiece surface can be machined during a continuous travel movement of the spindle.

These objects are achieved by a machine tool according to claim 1. The dependent claims refer to advantageous embodiments of the machine tool according to the invention.

The machine tool according to the invention for machining a workpiece comprises: a spindle arm with a spindle for receiving a tool or the workpiece, wherein, for positioning the spindle in a processing area, the spindle arm is movably mounted on a spindle arm receiving section which is arranged on a machine column.

In order to pivot the spindle, the spindle arm comprises a first spindle arm section designed as a longitudinal element and rotatable in relation to the spindle arm receiving section about a first rotational axis, said first spindle arm section being hinged to the spindle arm receiving section, wherein the first rotational axis is disposed in a first end section of the spindle arm receiving section and in a first end section of the first spindle arm section; and a second spindle arm section designed as a longitudinal element and rotatable in relation to the first spindle arm section about a second rotational axis, said second spindle arm section being hinged to the first spindle arm section, wherein the second rotational axis is disposed in a second end section of the first spindle arm section and in a first end section of the second spindle arm section.

The spindle arm receiving section comprises a first subsection and a second subsection, which are arranged on the machine column at a distance from each other to receive the spindle arm, wherein the first subsection of the spindle arm receiving section has a first braced drive for transmitting a first torque to the first spindle arm section for a rotational movement of the first spindle arm section about the first rotational axis.

The first spindle arm section comprises a first subsection and a second subsection, which are arranged on the spindle arm receiving section at a distance from each other in order to receive the second spindle arm section, wherein the first subsection of the first spindle arm section has a second braced drive for transmitting a second torque to the second spindle arm section for a rotational movement of the second spindle arm section about the second rotational axis.

Thus, the spindle arm can be pivoted as a whole; however, it is simultaneously also possible to pivot each of its sections separately. A folding or unfolding movement of the spindle arm and a simultaneous pivoting of the spindle arm are rendered possible by designing the first and second spindle arm section as longitudinal elements. It is thus possible to reach a large region of the processing area by means of a small number of individual travel movements so as to move the spindle quickly to its final alignment position.

A high stability in the suspension and a high torsional rigidity of the long spindle arm are achieved by attaching the individual spindle arm sections between two subsections of the respectively upstream spindle arm section or by attaching the first spindle arm section between two subsections of the spindle arm receiving section.

Due to the attachment of the drives for the rotation of the first and second spindle arm section directly to the respective hinge, the required torque can be transmitted precisely as required to the respective downstream spindle arm section. Therefore, the spindle can be positioned accurately at one end of the spindle arm although its movement also results from the rotational movement of the first spindle arm section that takes place at the other end of the spindle arm section and thus relatively far away from the spindle. The number of drives at a hinge is not limited to 1 but depends on the force that shall be transmitted at the respective hinge, i.e. e.g. also on the weight of the spindle arm sections and on the kind of machining and/or the material to be processed. One drive each can also be attached to the respective second subsections of the spindle arm receiving section and the spindle arm sections. It is also possible to attach a drive to some, but not to all, second subsections of the spindle arm receiving section and of the spindle arm sections.

The bracing of the drives reduces the reverse play in the transmission and thus contributes to the precise positioning of the spindle.

In the machine tool according to the invention, a distance between the two subsections of the spindle arm receiving section is preferably larger than a distance between the two subsections of the first spindle arm section by arranging the first end section of the first spindle arm section between the two subsections of the spindle arm receiving section.

The widthwise dimensions of the spindle arm sections thus become smaller stepwise. By means of such an arrangement, it is possible to form very small angles between the first and second spindle arm section, i.e. to fold the spindle arm almost completely in such a way that the first and second spindle arm are almost oriented parallel to one another. As a result, spindle positions close to the first spindle arm section can also be achieved. Therefore, the pivoting range for the spindle is altogether increased.

Preferably, the first braced drive and the second braced drive each have four mechanically braced drive elements and each have one driven element.

The advantage is that a large-volume drive for transmitting the required torque can be realized with a large driven element, while this drive still operates with high precision since in each case two of the four drive elements can each be mechanically braced so as to eliminate the reverse play almost completely.

The four drive elements of the first braced drive are preferably arranged on the spindle arm receiving section along a circular arc with a maximum central angle of 180°; and the four drive elements of the second braced drive are uniformly arranged on the first spindle arm section along a circle.

The different arrangement with respect to the spindle arm receiving section and the first spindle arm section is due to the different dimensions of the driven elements at the hinge of the first rotational axis and at the hinge of the second rotational axis. While the driven element on the second rotational axis is small enough to be able to uniformly distribute the drive elements around the driven element without limiting the available pivoting range, this is no longer possible for the large driven element at the first rotational axis.

The machine tool preferably also has a third spindle arm section rotatable about a third rotational axis in relation to the second spindle arm section to receive the spindle, said third spindle arm section being hinged to the second spindle arm section, wherein the third rotational axis is located in a second end section of the second spindle arm section and the second spindle arm section has a third drive for transmitting a third torque to the third spindle arm section for a rotational movement of the third spindle arm section about the third rotational axis.

The third degree of freedom in the form of the third rotational axis renders possible the positioning of the spindle in the processing area as well as an alignment of the spindle in such a way that e.g. the surface contour of a workpiece can be traveled over and processed by means of a tool received in the spindle. Here, the tool axis according to the invention is not limited to three spindle arm rotation axes but the spindle arm can also have more than three (e.g. four) individually movable sections.

The first rotational axis, the second rotational axis and the third rotational axis are preferably oriented parallel to one another; and the machine tool preferably also has a numeric control which is designed to control the first braced drive on the spindle arm receiving section, the second braced drive on the first spindle arm section and the third drive on the second spindle arm section in such a way that an end section of the spindle at the third spindle arm section performs a rectangular path in a plane perpendicular to the parallel rotational axes due to simultaneous rotational movements of the first spindle arm section about the first rotational axis, of the second spindle arm section about the second rotational axis and of the third spindle arm section about the third rotational axis.

This means that, in the case of a workpiece which is positioned in front of the spindle arm and is e.g. rectangular, the surface facing the spindle arm and the upwardly facing surface of the workpiece can be traveled over in a continuous movement of the spindle by simultaneous rotational movements of the spindle arm sections about the respective rotational axes. A corresponding continuous travel movement of the spindle is also possible with rounded edges of the workpiece or with spherical workpieces. If the workpiece is additionally rotated, an all-round processing movement of the spindle is thus possible.

The braced drives arranged on the spindle arm receiving section and on the first spindle arm section are preferably designed as cycloid gears; and the third drive arranged on the second spindle arm section is designed as a cooled torque drive.

Cycloid gears have the advantage that they are particularly wear-resistant and durable and can transmit sufficiently high forces because of the long spindle arm and the machining operation. A torque drive has the advantage that it allows for large accelerations and great dynamics of the system and due to the lack of mechanical elements is low-maintenance. The cooling serves to compensate for the increased heat development of the torque drive.

The spindle arm preferably comprises a guiding element for guiding lines at a position where the second spindle arm section is hinged to the first spindle arm section, wherein the guiding element has a plurality of segments for the separate guiding of a plurality of lines.

In order to supply the drives at the spindle arm with energy and to supply the cooled torque drive with coolant, supply lines, such as power cables or liquid-carrying tubes, have to be guided to various locations at the spindle arm and/or up to the spindle. These supply lines are preferably guided inside the spindle arm. In order to avoid bending loads of the lines at the hinge of the second rotational axis in the case of a pivoting movement of the second spindle arm section, a guiding element is disposed at this hinge, wherein the different supply lines are guided through various segments of the guiding element. The supply lines are in this case not fixed in or at the hinge but are guided in floating fashion through the guiding element. The spindle arm can have a plurality of guiding elements, such that a plurality of hinges or each hinge of the spindle arm have a corresponding guiding element.

The machine tool according to the invention preferably also has a rotary table at the machine column that can be rotated about a rotary table rotational axis to receive the workpiece or the tool.

The workpiece to be processed is usually mounted on the rotary table and the processing tool is received in the spindle. However, it is also possible to attach a workpiece to the spindle and a tool to the rotary table. The above described possibilities of movement of the spindle arm serve to move the spindle towards the rotary table until the required distance has been reached in order to be able to process the workpiece surface and, in addition, serve to travel over the workpiece heightwise. The processing of the upward facing surface of the workpiece is also possible as a result of movements of the spindle arm. However, in order to be able to also process the workpiece side facing away from the spindle arm, a rotary table is required, by means of which another side of the workpiece can face the spindle arm, if necessary.

The machine tool according to the invention preferably also has a first linear axis for receiving the rotary table, wherein the rotary table can be moved along the first linear axis and the rotational axis of the rotary table is oriented at an angle between 0 degree and 90 degrees in relation to the first linear axis.

In order to be able to also process the workpiece widthwise in addition to a heightwise and lengthwise processing, the position thereof has to be laterally displaceable with a distance from the spindle arm receiving section in relation to the spindle. This is realized e.g. by a slidable rotary table. Thus, apart from the attachment area of the workpiece on the table, the entire surface of the workpiece can be reached by the spindle head. In addition, the rotary table can also be pivotable (i.e. can be rotated about a further axis in addition to the rotational axis of the rotary table) in such a way that e.g. the workpiece can be tilted towards the spindle arm. Due to the large reach of the spindle arm (with almost extended first and second spindle arm section) and the possibility of moving the third spindle arm section close to the spindle arm receiving section, it is possible to process small and also large workpieces all around.

The machine tool according to the invention preferably also has a second linear axis for receiving the spindle arm receiving section, wherein the second linear axis is oriented parallel to the first rotational axis and the spindle arm receiving section is movably arranged along the second linear axis on the machine column.

Above all, in long workpieces, it can be advantageous to be able to displace the spindle arm instead of the rotary table or to displace both the rotary table and the spindle arm.

The first spindle arm section preferably has a buffer section for stopping a rotational movement of the second spindle arm section in a direction towards the first spindle arm section.

The advantage is that damage to the first spindle arm section and to the second spindle arm section is avoided above all in the case of fast or uncontrolled movements of the spindle arm.

The machine column preferably has a receiving area to receive the spindle arm receiving section and a top-bottom direction is defined by a direction from the ceiling surface of an installation room for the machine tool to a stand space for the machine tool and the spindle arm receiving section is arranged at the receiving area either above the receiving area or below the receiving area or on the side of the receiving area.

The advantage is that the pivot arm can be mounted as required or in accordance with the space conditions either on the machine column in upright fashion or suspended from the top or laterally.

DETAILED DESCRIPTION OF THE DRAWINGS AND PREFERRED EMBODIMENTS OF THE PRESENT INVENTION

The present invention is described and explained in detail below by means of embodiments and the exemplary drawings.

Figure 1:
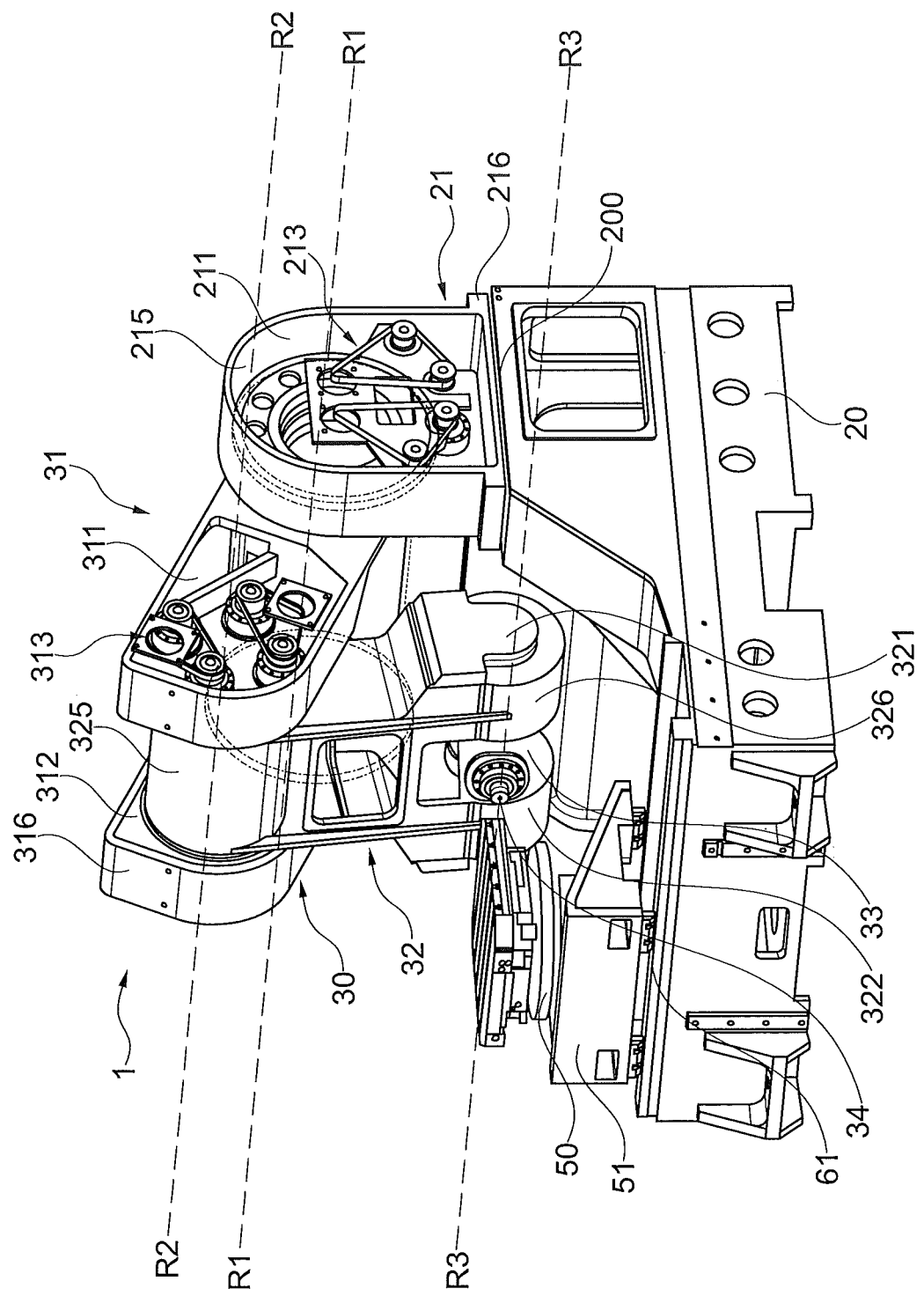
FIG. 1 shows an embodiment of a machine tool according to the invention at an angle from the front.

FIG. 1 shows an embodiment of the machine tool 1 according to the invention from a perspective at an angle from the front. The two-part spindle arm receiving section 21 with a first subsection 211 and a second subsection 212 is mounted on a receiving surface 200 of the machine column 20, wherein in FIG. 1 only the first subsection 211 is visible and the second subsection 212 is covered by the spindle arm 30.

The spindle arm 30 is composed of three parts and consists of a first spindle arm section 31, a second spindle arm section 32 and a third spindle arm section 33. The first spindle arm section 31 is elongated and has a first end section 315, which is arranged between the subsections 211, 212 of the spindle arm receiving section 21, and a second end section 316, which is composed of two parts from a first subsection 311 and a second subsection 312. The second spindle arm section 32 is also elongated and has a first end section 325, which is arranged between the subsections 311, 312 of the first spindle arm section 31, and a second end section 326, which in this embodiment is composed of two parts, namely of a first subsection 321 and a second subsection 322. The third spindle arm section 33 is arranged between the subsections 321, 322 of the second spindle arm section 32 and carries the spindle 34. Thus, every section of the spindle arm 30 is mounted on precisely another section of the spindle arm 30, wherein the forked shape of the two spaced subsections at one end of the longitudinal elements extends from the spindle arm receiving section 21 via the entire spindle arm 30 (first, second and third spindle arm section 31, 32, 33) to the end of the spindle arm 30 where the spindle 34 is received. Here, the subsections 211, 212 of the spindle arm receiving section 21 are not connected to one another whereas the subsections 311, 312 of the first spindle arm section 31 and the subsections 321, 322 of the second spindle arm section 32 are connected in a direction towards the center of the respective elongated spindle arm section.

On account of the three-link form of the spindle arm 30, all three sections 31, 32, 33 of the spindle arm 30 can be pivoted separately, wherein the spindle 34 carries out the sum of the pivoting movements of the spindle arm sections 31, 32, 33. In particular, the first end section 315 of the first spindle arm section 31 is hinged for this purpose to a first end section 215 of the spindle arm receiving section 21 (the second end section 216 of the spindle arm receiving section 21 is mounted on the receiving area 200 of the machine column 20) in such a way that the first spindle arm section 31 (and thus the entire spindle arm 30) can be rotated about a first rotational axis R1. The arrangement of the gears for transmitting the rotational movement to the first spindle arm section 31 is specified by means of FIG. 3. Similarly, the first end section 325 of the second spindle arm section 32 is hinged to the second end section 316 of the first spindle arm section 31 in such a way that the second spindle arm section 32 (plus the third spindle arm section 33 and the spindle 34) can be rotated about a second rotational axis R2. The third spindle arm section 33 is attached to the second end section 326 of the second spindle arm section 32 so as to be rotatable about a third rotational axis R3 and serves to receive the spindle 34, which can be rotated in the longitudinal direction of the spindle about the rotational axis R4 of the spindle (see FIG. 2A). Therefore, all three hinges of the spindle arm are designed as hinge joints, wherein the three rotational axes R1, R2, R3 are aligned parallel to one another and parallel to the stand space of the machine tool 1.

In addition, the machine column 20 of the machine tool 1 according to the invention has two guide rails of a first linear axis 61, on which a slide 51 can be moved parallel to the rotational axes R1, R2, R3. A rotary table 50 is mounted on the slide 51 and can be rotated about a rotary table rotational axis R5 (see FIG. 2A), which is perpendicular to the stand space of the machine tool 1. The rotary table 50 can also be designed so as to be additionally pivoted on the slide 51.

Figure 2A:
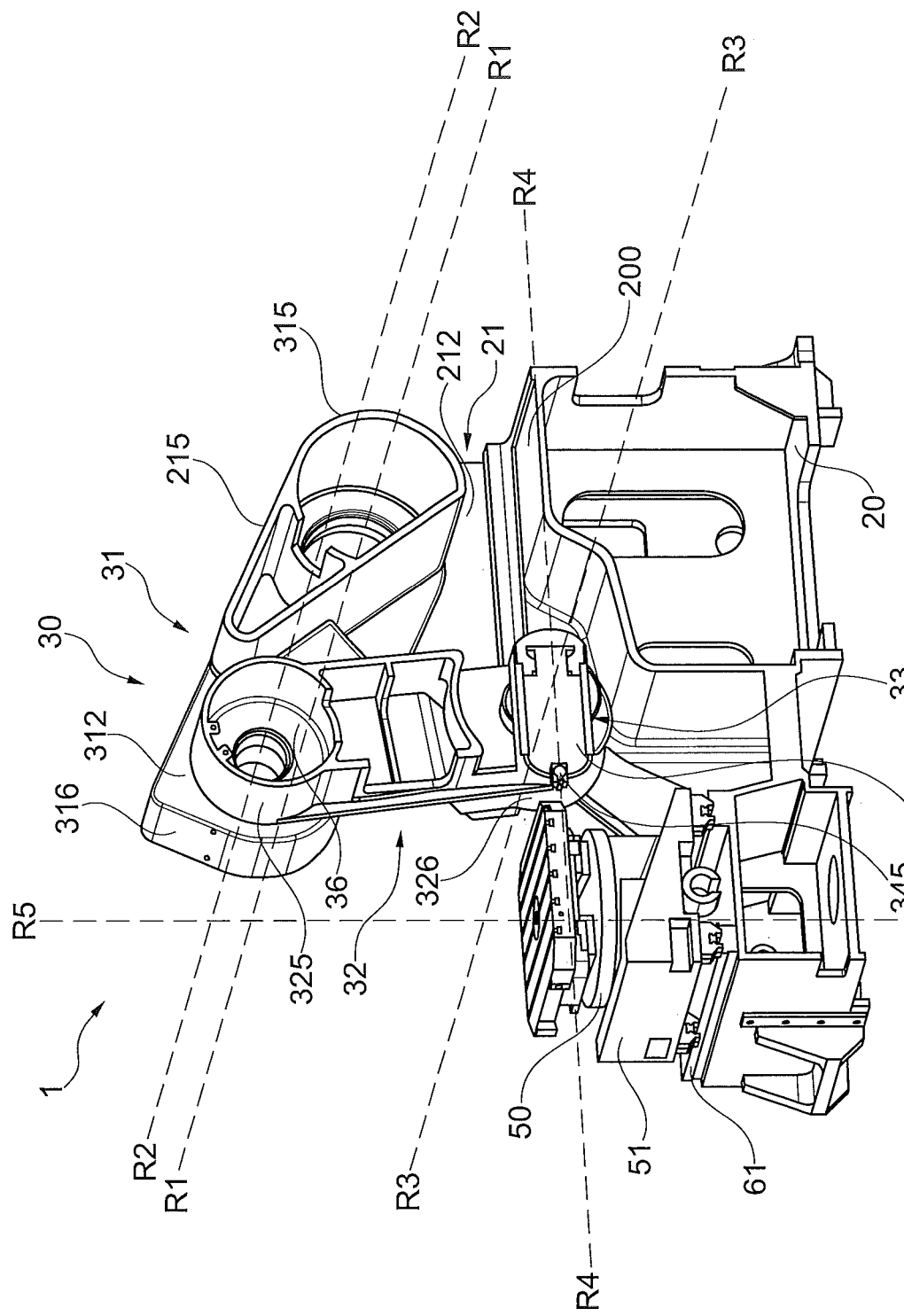
FIG. 2A shows a sectional view of an embodiment of a machine tool according to the invention at an angle from the front.

FIG. 2A shows a section through the machine tool 1 according to the invention along a longitudinal direction of the spindle arm 30. Well visible are, on the one hand, the braces of the first spindle arm section 31 and of the second spindle arm section 32 widthwise and the arrangement of the spindle 34 on the second end section 326 of the second spindle arm section 32 and, on the other hand, the position of the parallel rotational axes R1, R2, R3 of the spindle arm sections 31, 32, 33, of the rotational axis R4 of the spindle and of the rotational axis R5 of the rotary table.

The position of the first rotational axis R1 in space is fixed. The directions of the second and third rotational axis R2 and R3 are also invariable, namely parallel to the first rotational axis R1, however, the height thereof above the floor depends on the orientation of the first spindle arm section 31 (for R2) and/or the orientation of the first and second spindle arm section 31 and 32 (for R3). The orientation of the rotational axis R4 of the spindle corresponds to the alignment of the spindle 34 and depends on the orientation of all three spindle arm sections 31, 32, 33. The orientation of the rotary table rotational axis R5 is independent of the spindle arm 30 and is perpendicular to the floor area in the case of a non-pivotable rotary table 50.

Figure 2B:
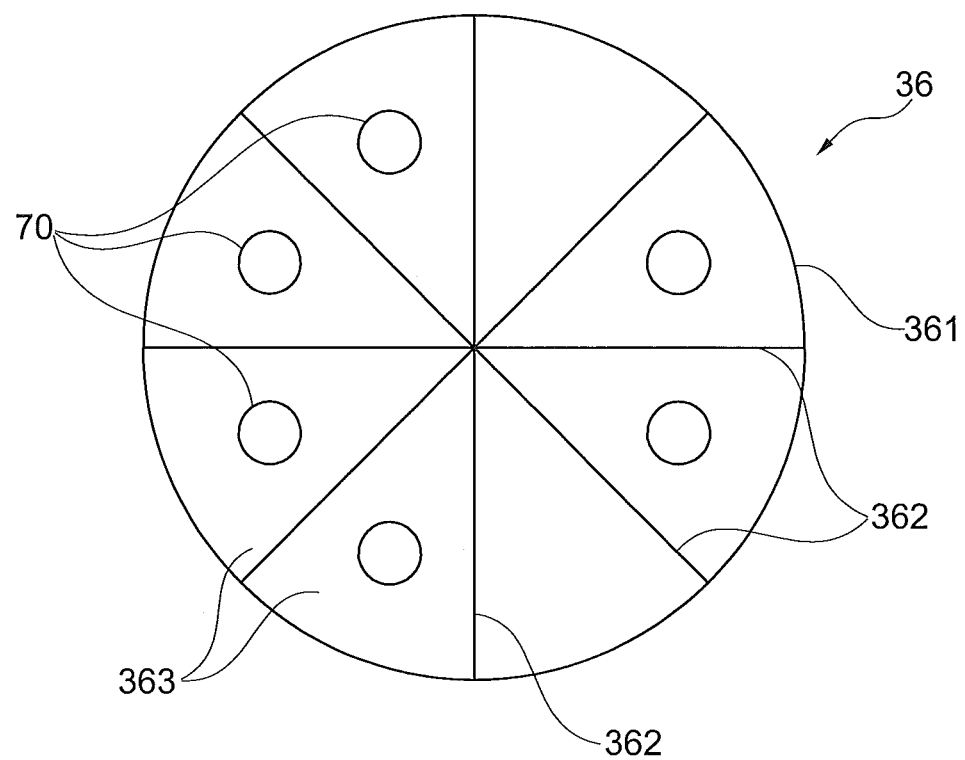
FIG. 2B shows an embodiment of a guiding element of a machine tool according to the invention.

The hinge of the second rotational axis R2 shows a guiding element 36 through which lines 70 (supply lines for cooling liquid and power cables) are guided. An exemplary form of the guiding element 36 is shown in FIG. 2B. The guiding element 36 is circular with a circular casing 361 and ridges 362, which divide the guiding element 36 into several segments 363. The lines 70 are guided individually through the segments 363, wherein the lines 70 are not attached to the guiding element 36 to avoid bending loads during a rotation of the second spindle arm section 32 about the second rotational axis R2.

The guiding element 36 is connected in rotationally fixed fashion to the second spindle arm section 32 in such a way that it rotates in the same direction when the second spindle arm section 32 performs a pivoting movement. Therefore, the lines 70, which are guided to the second end section 326 of the second spindle arm section 32, can be guided in a longitudinal direction of the second spindle arm section 32 in a straight path within the second spindle section 32.

The hinge at the first rotational axis R1 and the hinge at the third rotational axis R3 can also have corresponding guiding elements 36.

Figure 3A:
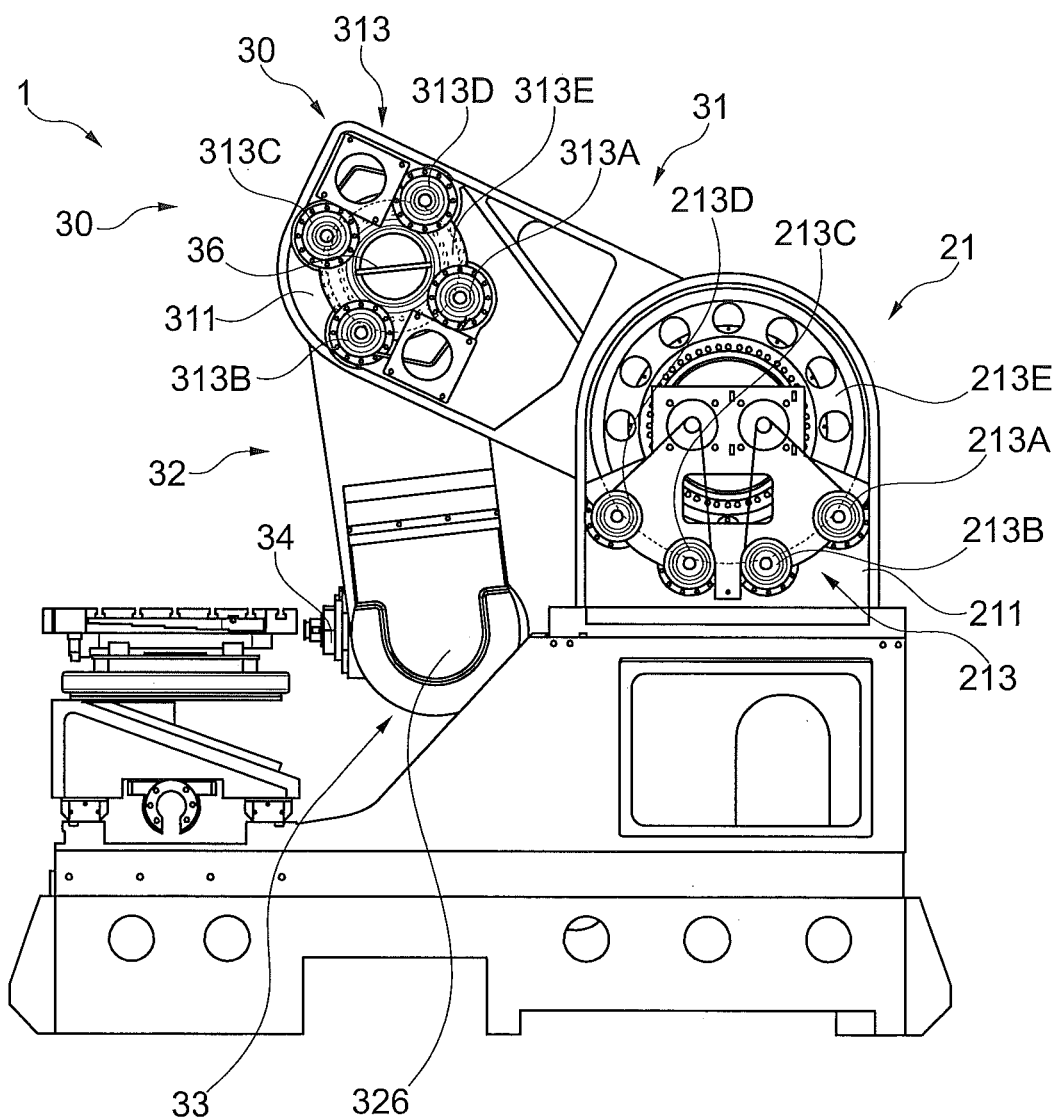
FIG. 3A shows an embodiment of a machine tool according to the invention from the side.

FIG. 3A shows an embodiment of the machine tool 1 according to the invention from the side. In this view, the three rotational axes R1, R2, R3 are oriented perpendicularly to the paper plane. In order to transmit a rotational movement to the first spindle arm section 31, the first subsection 211 of the spindle arm receiving section 21 has a first braced drive 213 which consists of four circular drive elements 213A-213D and a circular driven element 213E with larger, e.g. sixfold, radius in relation to the radius of the drive elements 213A-213D. The drive elements 213A-213D are arranged circumferentially on the driven element 213E and together transmit a torque to the driven element 213E. The bracing of the drive elements 213A-213D for eliminating the reverse play and thus for the more precise positioning of the spindle 34 can be e.g. realized by mechanically bracing the four drive elements 213A-213D in groups of two using a belt, wherein the belts run around the two drive elements 213A, 213B and 213C, 213D, respectively, and around a third fixed point in the circle area of the driven element 213E, thus forming two triangles. The drive elements 213A-213D at the spindle arm receiving section 21 are not distributed uniformly over the circumference of the driven element 213E but only on the lower circular arc half of the driven element 213E so as not to limit the swiveling range of the first spindle arm section 31. The first braced drive 213 at the spindle arm receiving section 21 can be designed as a cycloid gear which is distinguished by a particularly high rigidity compared to other transmissions. By means of a braced cycloid gear, the relatively heavy and long spindle arm 30 can be moved precisely, such that the spindle 34 can be positioned accurately although one of the three rotational movements for positioning the spindle 34 is carried out at a distance from the spindle 34 at the opposite end of the spindle arm 30 and a second rotational movement is carried out in about the center of the spindle arm 30.

In order to transmit a rotational movement to the second spindle arm section 32, which is carried out independently of the rotational movement of the first spindle arm section 31, the first subsection 311 of the first spindle arm section 31 has a second braced drive 313, which consists of four circular drive elements 313A-313D and a circular driven element 313E with larger, e.g. twofold, radius in relation to the radius of the drive elements 313A-313D. The drive elements 313A-313D are circumferentially arranged on the driven element 313E and together transmit a torque to the driven element 313E. The bracing of the drive elements 313A-313D for eliminating the reverse play and thus for the more precise positioning of the spindle 34 can be e.g. realized in that the four drive elements 313A-313D are mechanically braced in groups of two by means of a belt, wherein the belts run around the two drive elements 313A, 313B and 313C, 313D, respectively, and around a third fixed point outside the circle area of the driven element 313E so as to form two triangles. The drive elements 313A-313D at the first spindle arm section 31 are uniformly distributed over the circumference of the driven element 213E. The second braced drive 313 at the first spindle arm section 31 can also be designed as a cycloid gear.

In order to transmit a rotational movement to the third spindle arm section 33, which is carried out independently of the rotational movements of the first and second spindle arm section 31, 32, the second end section 326 of the second spindle arm section 32 has a third drive 323. In the embodiment shown in FIG. 3A, the second end section 326 of the second spindle arm section 32 is designed as two parts or in the form of a fork, like the corresponding end sections 215 and 316 of the spindle arm receiving section 21 and of the first spindle arm section 31, such that in this embodiment the third drive 323 is disposed between the subsections 321, 322 of the second spindle arm section 32. The third drive 323 can be designed as a cooled torque drive which, due to the cooling, distinguishes itself by thermal stability, high dynamics and high driving rigidity.

Figure 3B:
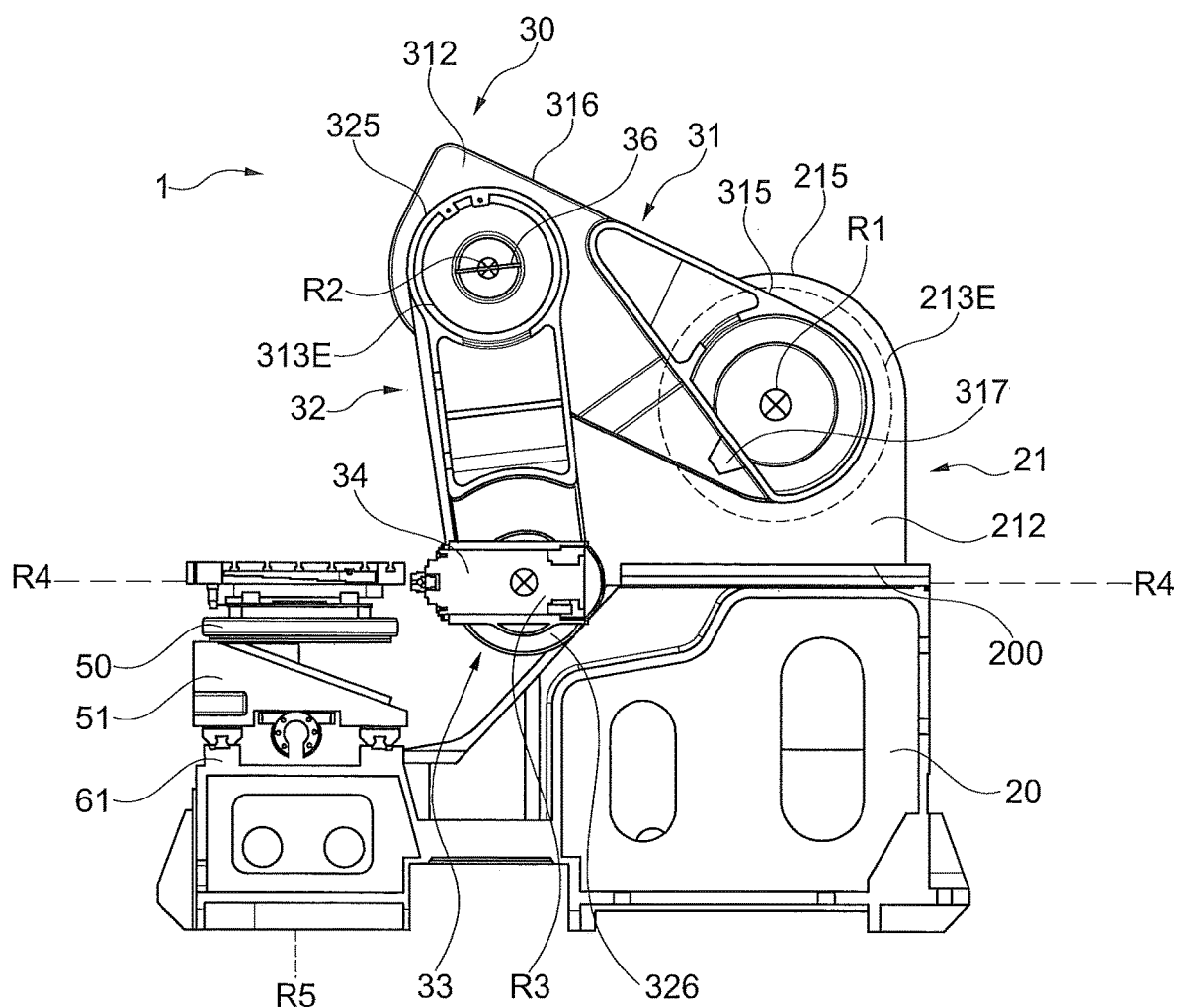
FIG. 3B shows a sectional view of an embodiment of a machine tool according to the invention from the side.

The movability of the spindle arm 30 is explained once again by means of FIG. 3B. FIG. 3B shows a sectional view of an embodiment of the machine tool according to the invention from the same perspective as in FIG. 3A. The rotational axes R1, R2, R3 of the spindle arm 30 are oriented perpendicularly to the paper plane. The spindle arm receiving section 21 is arranged on the receiving surface 200 of the machine column 20, wherein in FIG. 3B only one of the two spatially separated subsections 211, 212 of the spindle arm receiving section 21 is visible. The spindle arm 30 at the first end section 315 is hinged to the spindle arm receiving section 21 of the first spindle arm section 31, such that the first end section 215 of the spindle arm receiving section 21 and the first end section 315 of the first spindle arm section 31 form a hinged joint. On account of the size of the involved components (i.e. the first end section 215 of the spindle arm receiving section 21, of the first end section 315 of the first spindle arm section 31 and of the large wheel-shaped driven element 213E), the motor of the first braced drive 213 can here be accommodated at this hinge in a space-saving way in the hollow shaft of the hinge. The buffer section 317 is disposed at the spindle arm section 31 and stops a movement of the second spindle arm section 32 about the second rotational axis R2 towards the first spindle arm 31.

A similar design in a somewhat smaller form is also found at the hinge of the second rotational axis R2. This is where the second spindle arm section 32 is hinged via its first end section 325 to the second end section 316 of the first spindle arm section 31. The driven element 313E of the second braced drive 313 that is smaller in relation to the driven element 213E is also shown. Here, too, only one of the two subsections 311, 312 of the second end section 316 of the first spindle arm section 31 is shown.

At the hinge of the third rotational axis R3, the spindle 34 is disposed at the third spindle arm section 33, which is accommodated between the subsections 321, 322 of the second end section 326 of the second spindle arm section 32 and can be rotated about the third rotational axis R3. The tool 35 (not shown) accommodated in the spindle 34, as such or with the spindle head, can be rotated about the axis R4 to carry out the machining operation.

Also shown is the table 50, which can be rotated about the axis R5, with pallet on the slide 51, which is movably mounted on the guide rails of the first linear axis 61.

Figure 4:
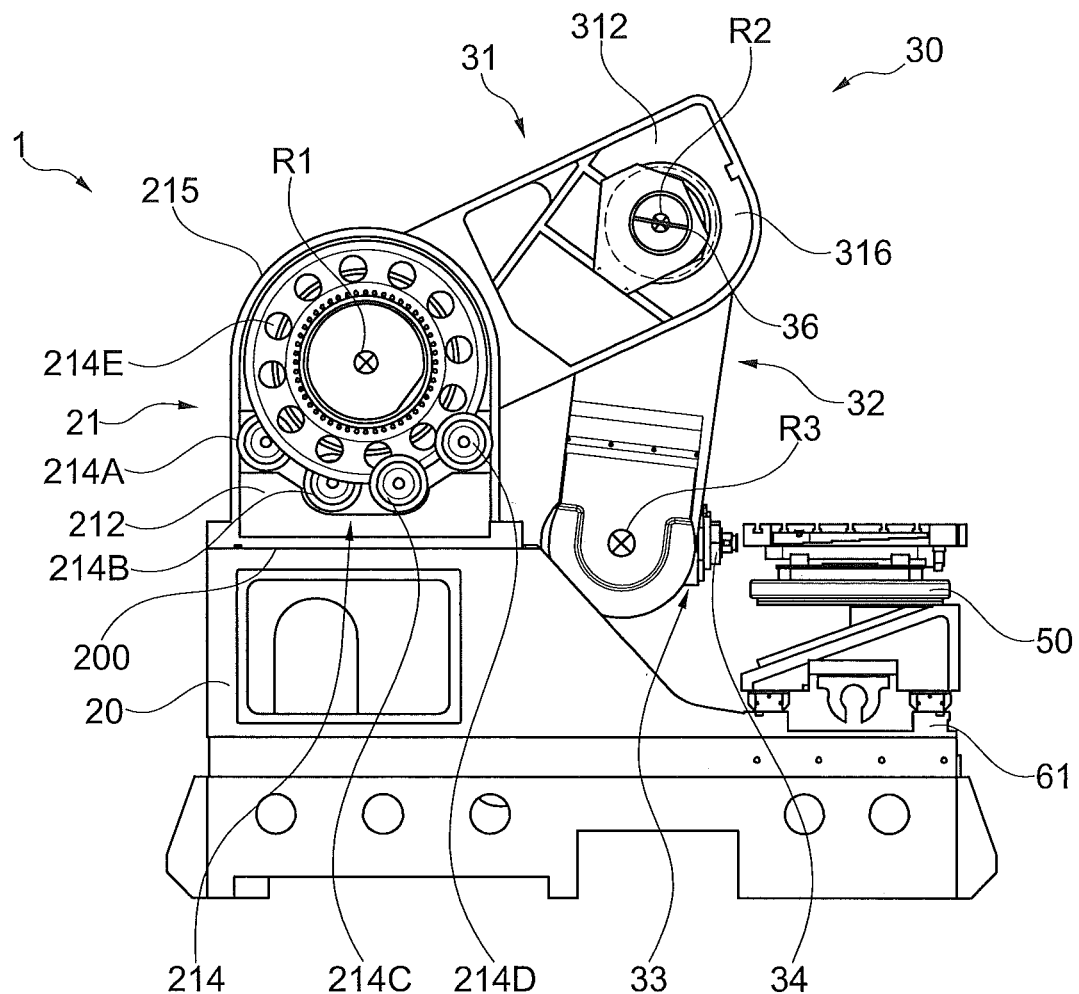
FIG. 4 shows an embodiment of a machine tool according to the invention from the other side.

FIG. 4 shows the design of an embodiment of the machine tool 1 according to the invention from the opposite side as compared to FIG. 3A. In this embodiment, the distribution of the drives at the two sides of the machine tool 1 is not symmetric. While four drive elements 214A-D set a driven element 214E in rotation at the second subsection 212 of the spindle arm receiving section 21 as well as at the first subsection 211 (see FIG. 3A), no drive elements are disposed at the second subsection 312 of the first spindle arm section 31 in contrast to the first subsection 311 (see FIG. 3A). The distribution of the drives depends on the magnitude of the torque which shall be transmitted at the respective hinge and in another embodiment of the machine tool 1 according to the invention can be symmetric or asymmetric in another way.

Figure 5:
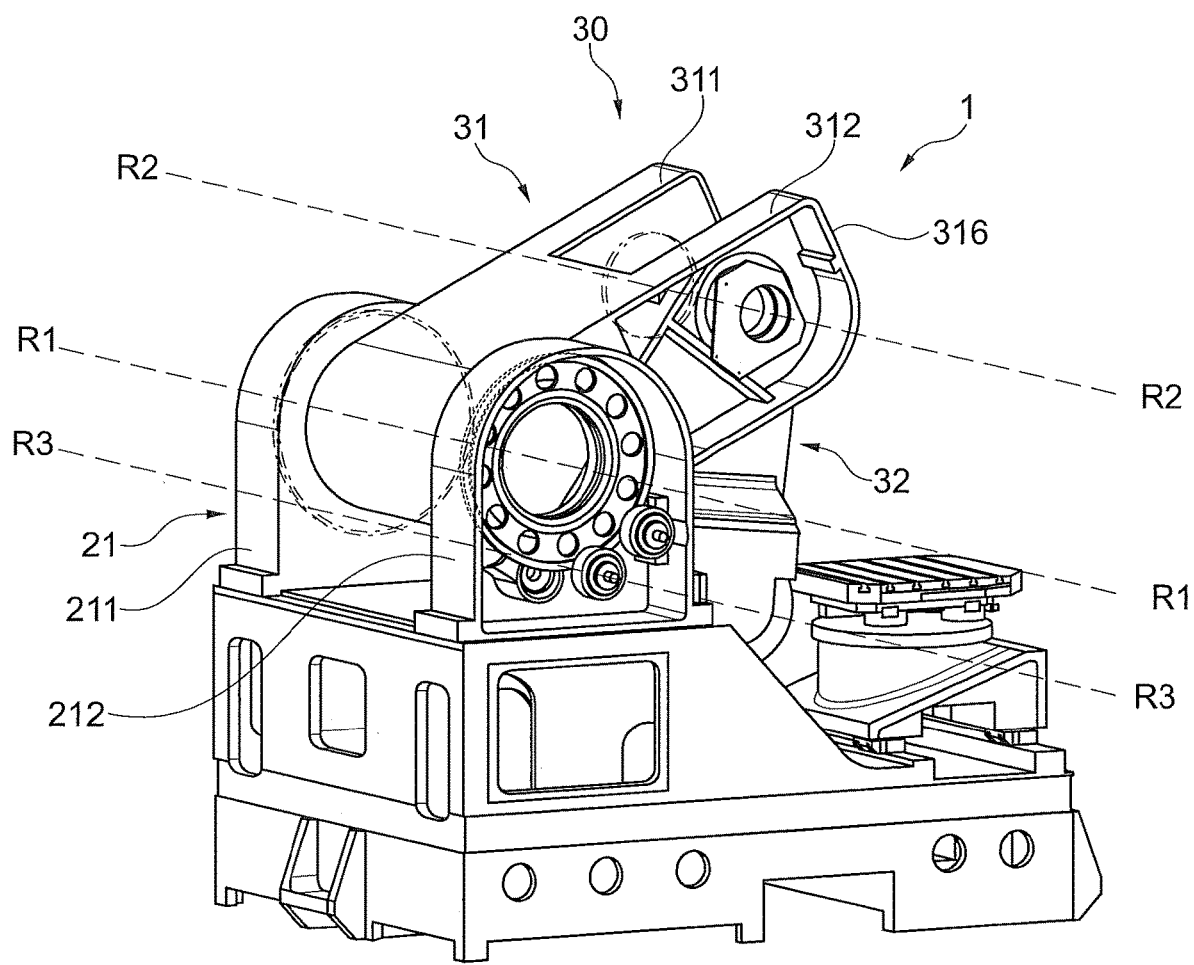
FIG. 5 shows an embodiment of a machine tool according to the invention at an angle from behind.
Figure 6:
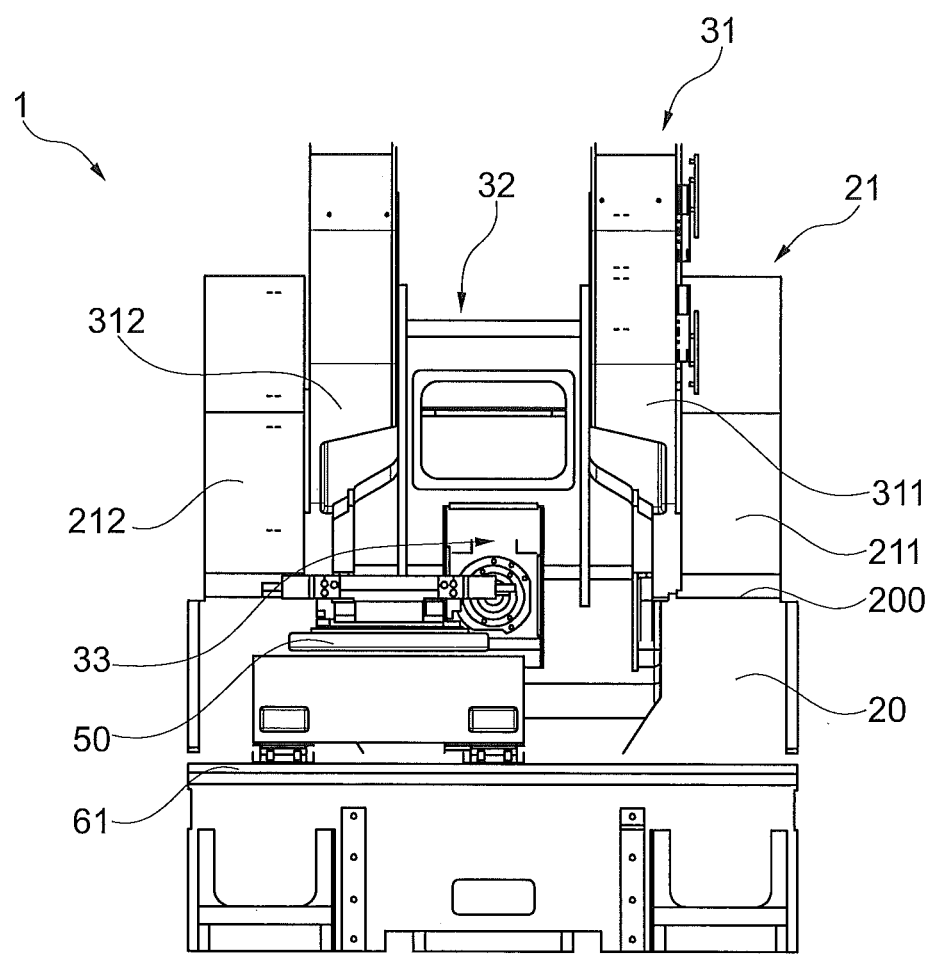
FIG. 6 shows an embodiment of a machine tool according to the invention from the front.
Figure 7:
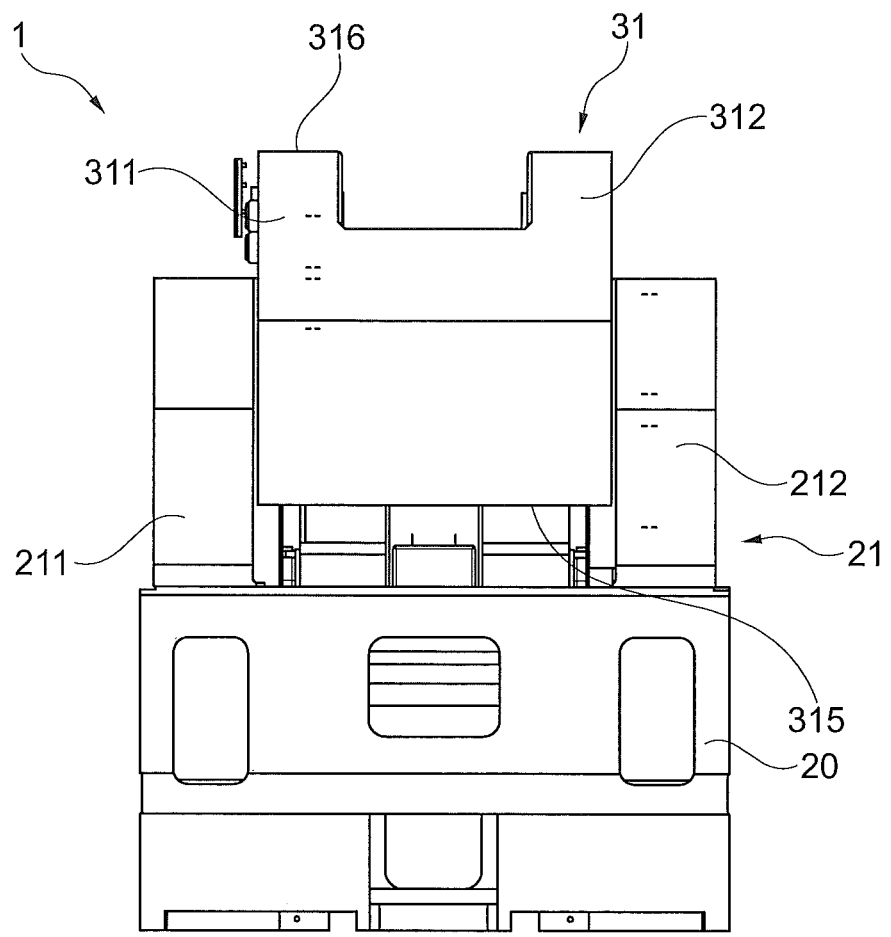
FIG. 7 shows an embodiment of a machine tool according to the invention from behind.

FIGS. 5, 6 and 7 show embodiments of the machine tool 1 according to the invention from further perspectives (FIG. 5 at an angle from behind, FIG. 6 from the front, FIG. 7 from behind) which show the two-part form and/or the fork form of the design of the spindle arm receiving section 21 with the two subsections 211, 212 and the spindle arm sections 31 and 32 each having two subsections 311, 312 and 321, 322, respectively, at their respective second end sections 316 and 326.

Figure 8A:
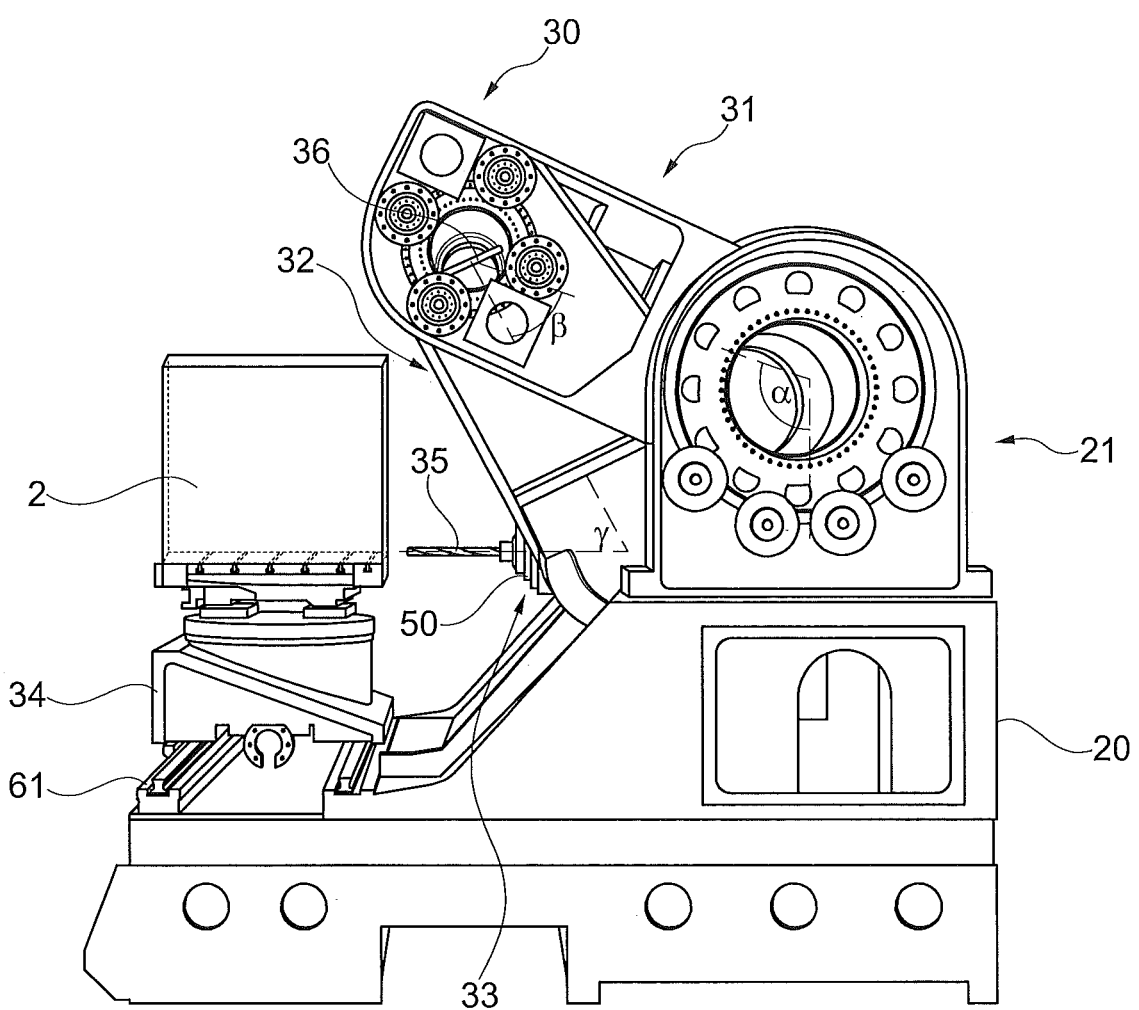
FIG. 8A shows an embodiment of a machine tool according to the invention in a position of a positioning movement of the spindle for a long workpiece.
Figure 8B:
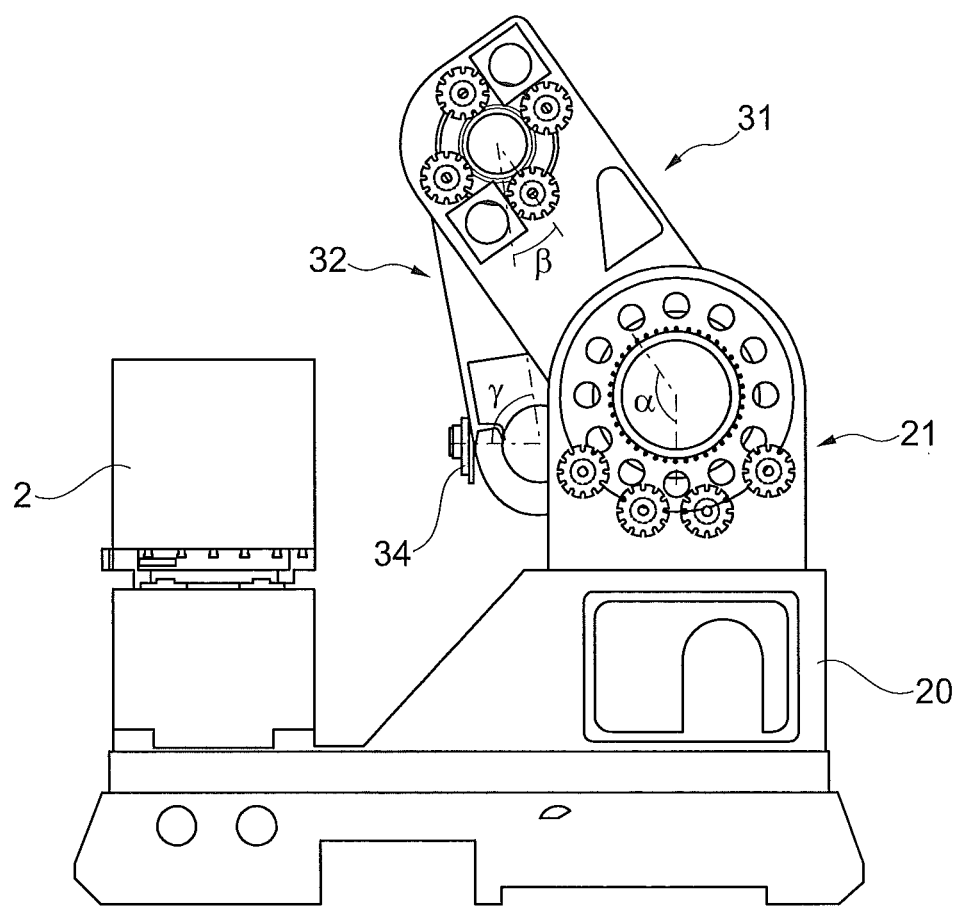
FIG. 8B shows an embodiment of a machine tool according to the invention in a further position of a positioning movement of the spindle.
Figure 8C:
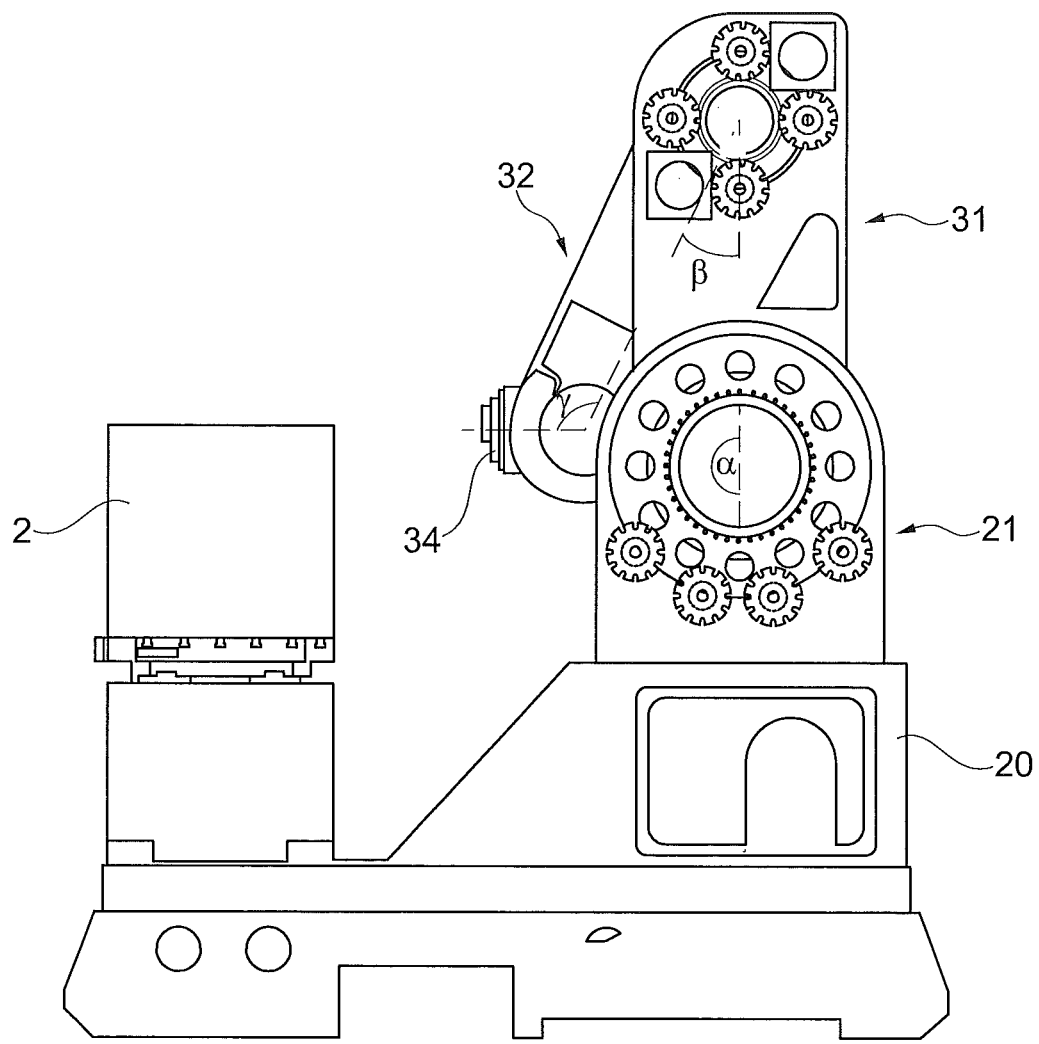
FIG. 8C shows an embodiment of a machine tool according to the invention in a further position of a positioning movement of the spindle.
Figure 8D:
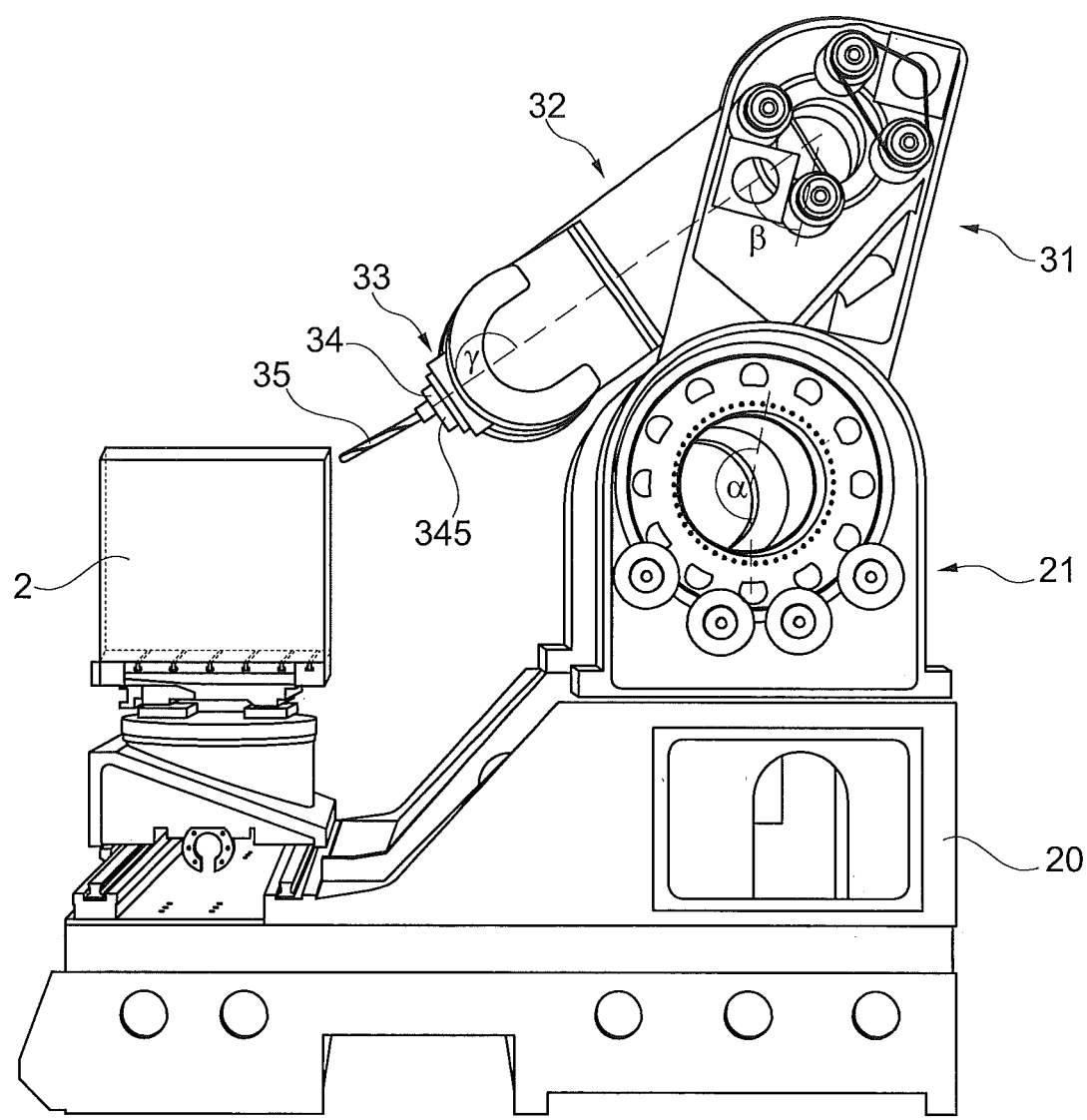
FIG. 8D shows an embodiment of a machine tool according to the invention in a further position of a positioning movement of the spindle.
Figure 8E:
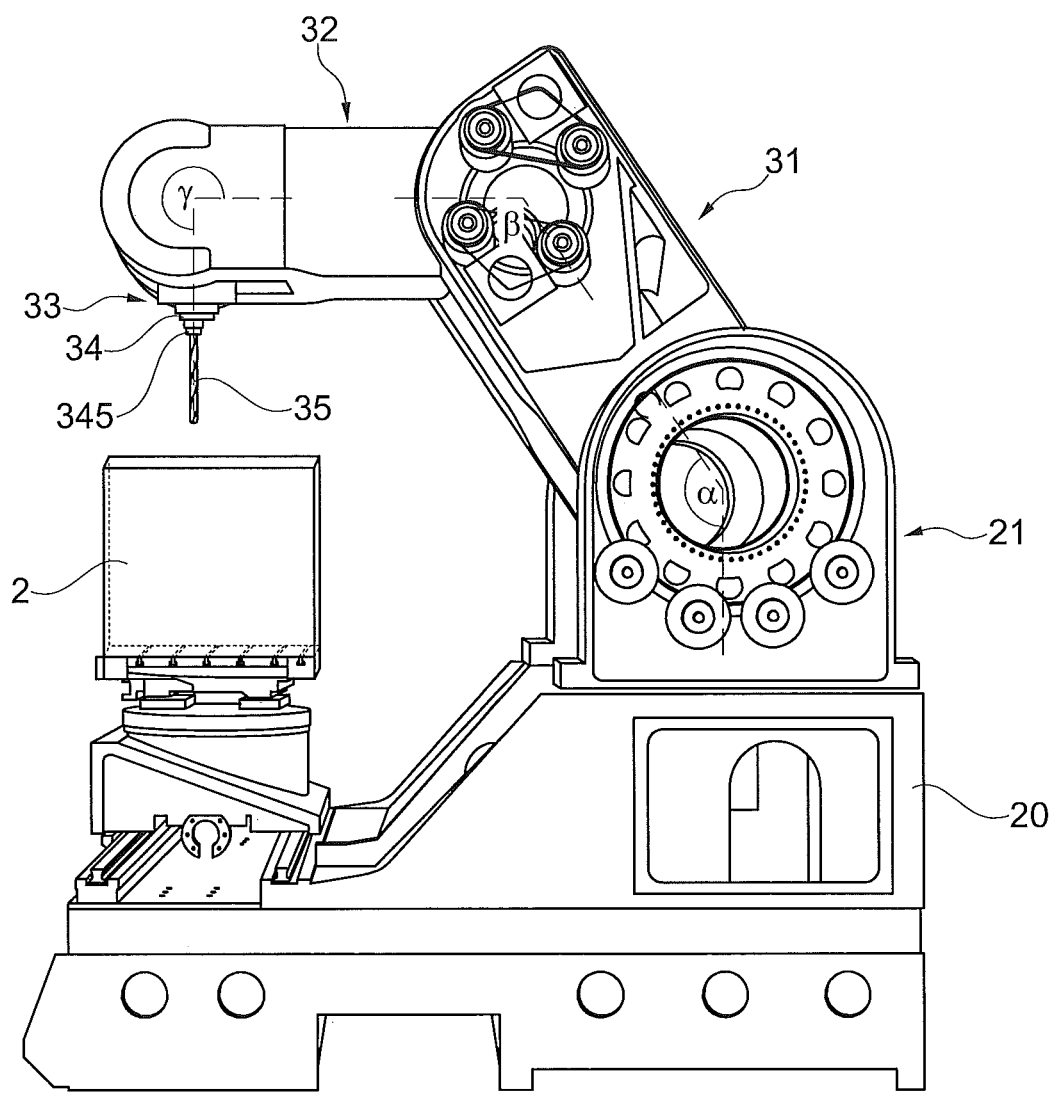
FIG. 8E shows an embodiment of a machine tool according to the invention in a further position of a positioning movement of the spindle.

FIGS. 8A-E show various processing positions of the spindle arm 30 with a long drill 35 during an all-round processing of a cube-shaped workpiece 2, wherein the tool 35 on the spindle arm 30 travels a path along two adjacent surfaces of the cube, which are referred to below as front side and top side of the workpiece 2. In FIGS. 8A-C, the spindle 34 is aligned to the front side, and FIG. 8D shows the transition to the top side. In FIG. 8E, the spindle 34 is aligned to the top side.

FIG. 8A shows a positioning of the spindle 34 with the tool 35 to the lower edge of the front side of the workpiece 2, FIG. 8B illustrates a positioning of the spindle 34 (the tool 35 is not shown) to the central region of the front side of the workpiece 2 and FIG. 8C illustrates a positioning of the spindle 34 (the tool 35 is not shown) to the upper edge of the front side of the workpiece 2. FIGS. 8A-C show that, in a travelling or processing movement of the spindle along the front surface of the workpiece 2 from bottom to top, the angle α between the spindle arm receiving section 21 and the first spindle arm section 31 is increased and the angle ß between the spindle arm section 31 and a second spindle arm section 32 is not subjected to major modifications. The angle γ between the second spindle arm section 32 and the third spindle arm section 33 also increases. However, the changes in the angles depend on the dimensions and the distance of the workpiece 2 from the spindle arm receiving section 21. In addition, the angle combination (α; ß; γ), by means of which a certain spindle orientation is achieved, is not necessarily unambiguous since the same orientation is also obtained e.g. when angle ß is smaller if the angle α is simultaneously chosen to be larger. On account of the complex calculations, a CNC control for controlling the pivoting movements of the spindle arm sections 31, 32, 33 is therefore preferably used, said control determining a suitable angle combination (α; ß; γ) for a particular spindle positioning. In order to process workpieces 2 having a greater height than the workpiece 2 shown in FIGS. 8A-C, the first spindle arm section 31 is pivoted further to the right such that the angle α becomes greater than 180°.

However, the possibility of creating an angle α>180° between the spindle arm receiving section 21 and the first spindle arm section 31 by pivoting the first spindle arm section 31 is also already used for the workpiece 2 shown in FIGS. 8A-E, as illustrated in FIG. 8D. This figure shows the transition of the movement of the spindle arm from processing the front side to processing the top side. On account of the long processing tool 35, the tool tip is kept at a sufficient distance from the top side of the workpiece. However, in this position, it is also possible to process e.g. a spherical workpiece 2.

FIG. 8E shows a spindle position for processing the top side of a cube-shaped workpiece 2 by means of the long tool 35. In this position, the second spindle arm section 32 and the longitudinal axis of the tool 35 form a right angle.

Figure 9A:
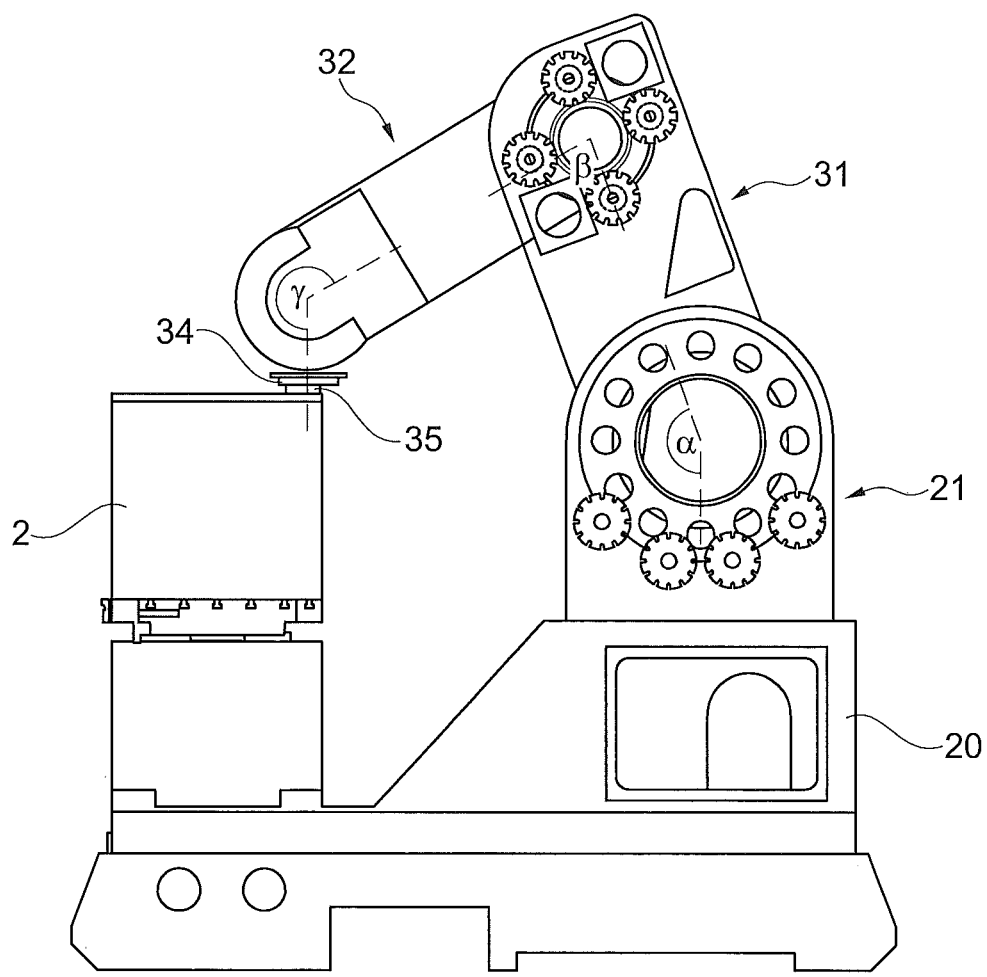
FIG. 9A shows an embodiment of a machine tool according to the invention in a position of a positioning movement of the spindle for a short tool.
Figure 9B:
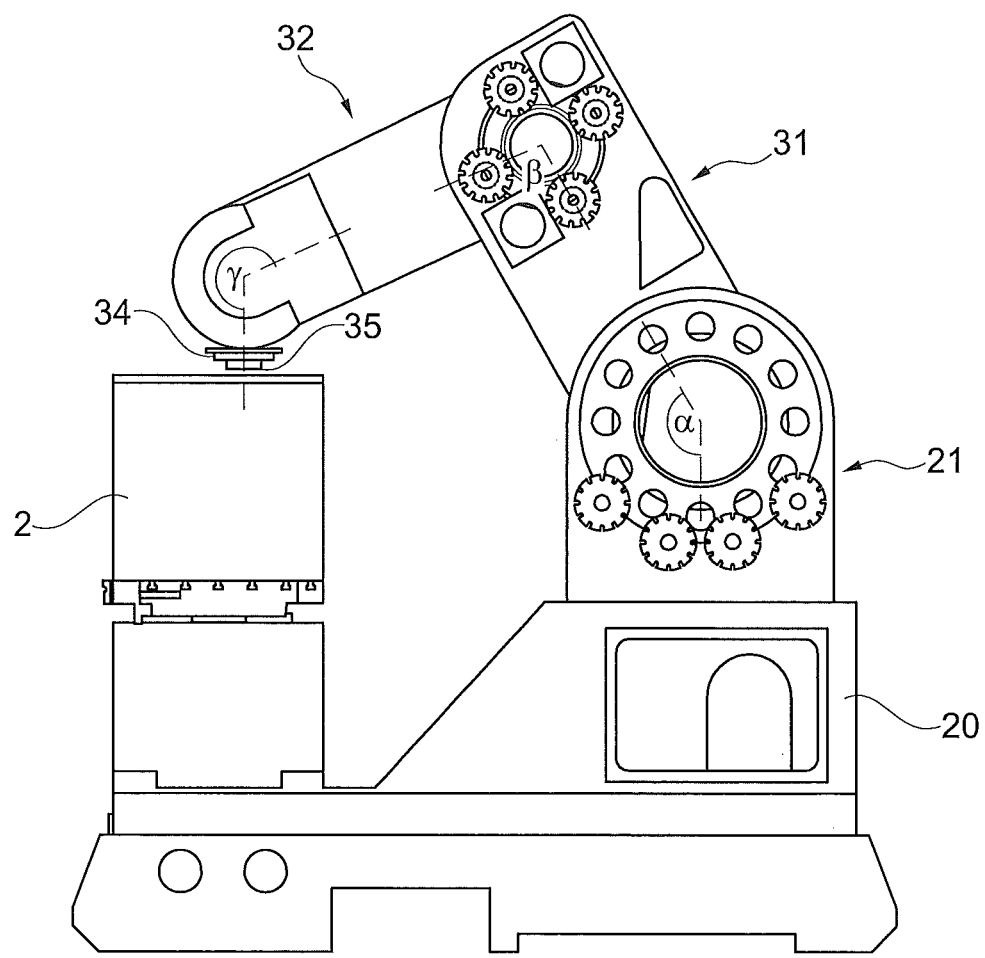
FIG. 9B shows an embodiment of a machine tool according to the invention in a further position of a positioning movement of the spindle.
Figure 9C:
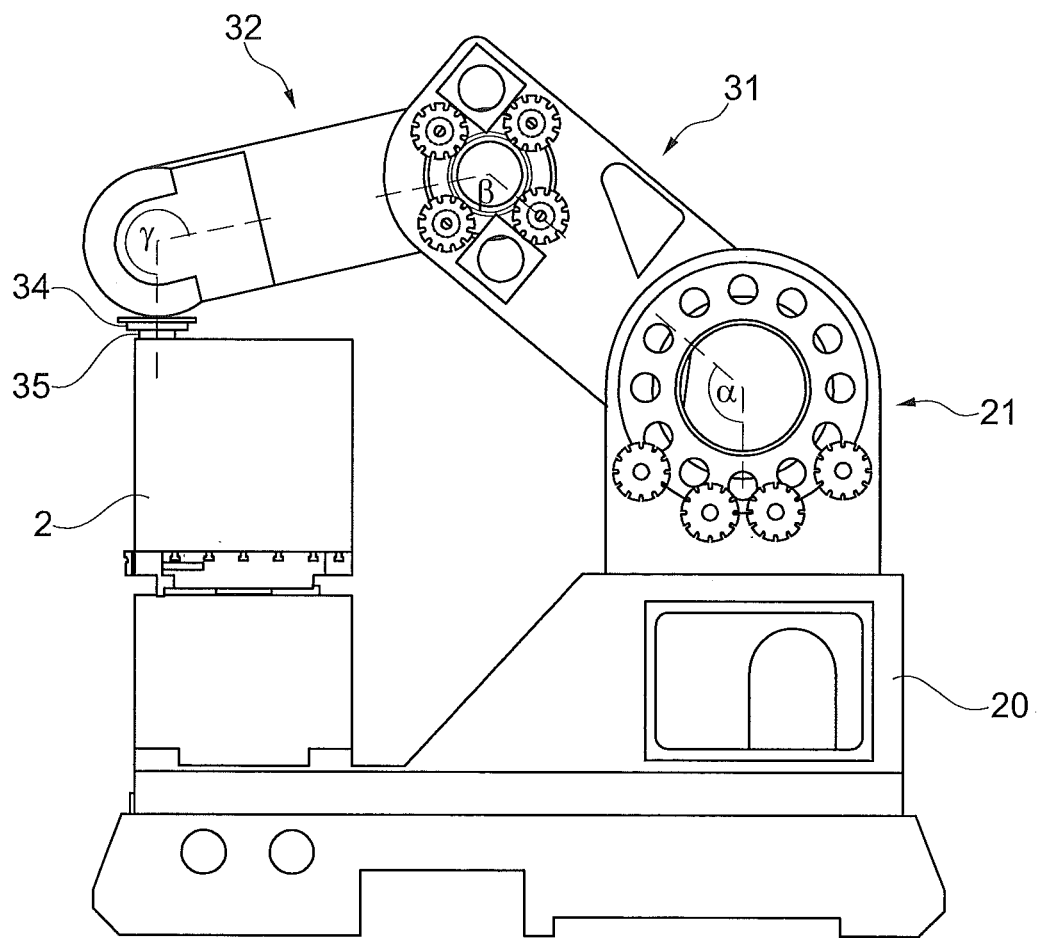
FIG. 9C shows an embodiment of a machine tool according to the invention in a further position of a positioning movement of the spindle.

FIGS. 9A-C and FIG. 8E show the top side processing of a cube-shaped workpiece 2, however by means of a short tool 35 at the spindle 34. FIG. 9A shows the processing of the front edge of the top side of the workpiece 2, FIG. 9B shows the processing in a central region of the top side and FIG. 9c shows the processing of the rear edge of the top side. As compared to the top side processing by means of a long tool, the angle ß is, in this case, smaller during the entire travel path along the top side.

Figure 10:
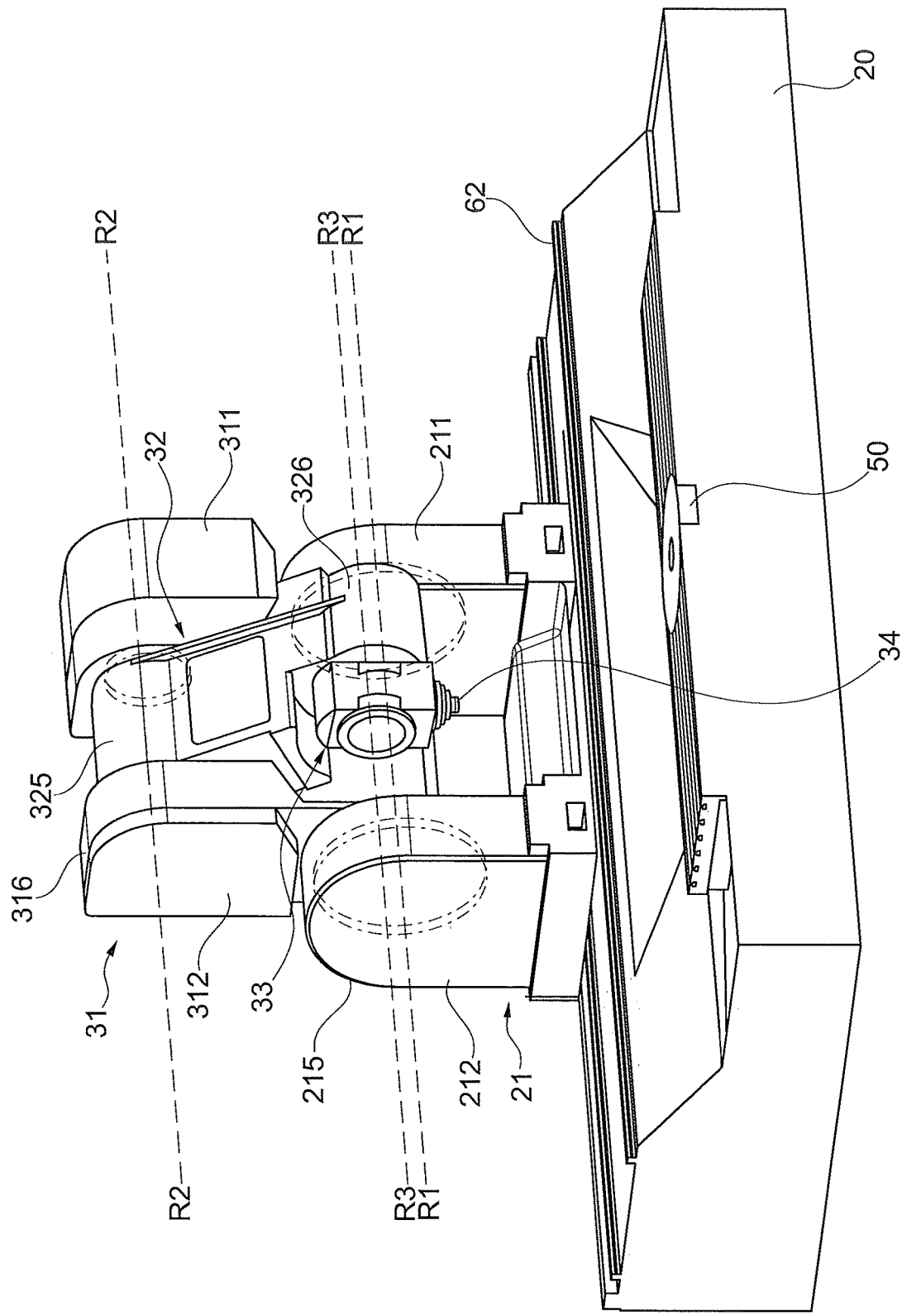
FIG. 10 shows a further embodiment of a machine tool according to the invention.
Figure 11:
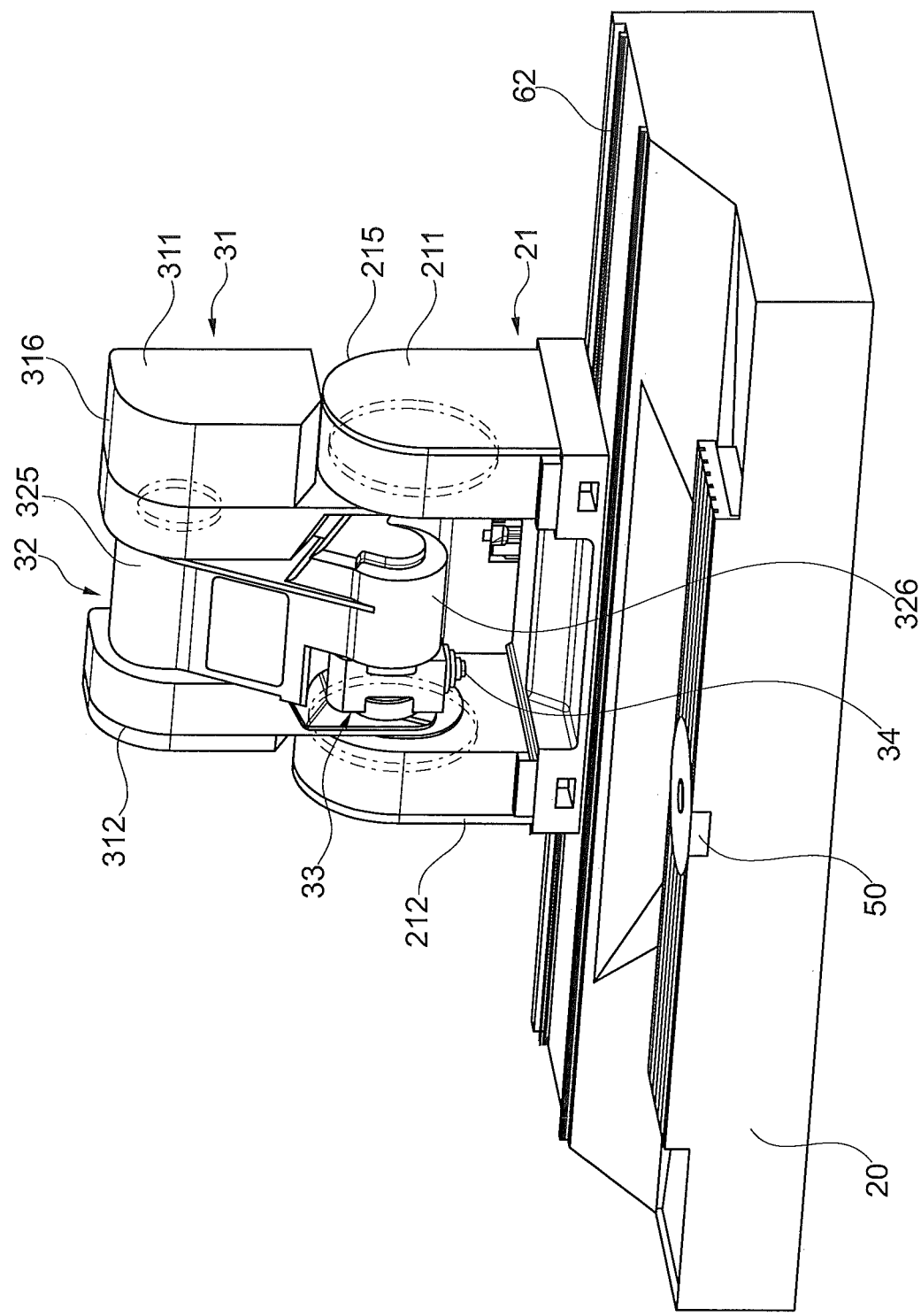
FIG. 11 shows a further embodiment of a machine tool according to the invention from a further perspective.

FIGS. 10 and 11 show a further embodiment of a machine tool 1 according to the invention from two different perspectives at an angle from the front. In contrast to FIGS. 1-9, the machine column 20 in FIGS. 10 and 11 has the form of a long machine bed, wherein the spindle arm receiving section 21 with the spindle arm 30 can be moved on two guide rails of a second linear axis 62 which runs parallel to the three rotational axes R1, R2, R3.

Furthermore, the second end section 326 of the second spindle arm section 32 does not have a two-part and/or fork-like form but only consists of one part next to which the third spindle arm section 33 with the spindle 43 is arranged.

In addition, the rotary table 50 is no longer linearly movable but is inserted in the machine column 20 in such a way that it can only be rotated.

In this embodiment, the drives for the rotational movements are accommodated in the hollow shaft of the hinge of the first rotational axis R1 (first braced drive 211), in the first subsection 311 of the first spindle arm section 31 (second braced drive 311) and in the second end section 326 of the second spindle arm section 32 (third drive 321).

The present invention is not limited to the above described embodiments but the individual aspects and/or individual features of the above described embodiments can rather be combined to provide further embodiments of the present invention.

In particular, a machine tool 1 according to the invention can also comprise both linear axes 61 and 62. Furthermore, a machine tool 1 according to the invention can comprise two processing stations which are disposed on opposite sides of the machine tool 1, wherein the 360° pivotability of the second spindle arm section 32 is used to change from one processing station to the other. A machine tool 1 according to the invention can also consist of more than three spindle arm sections 31, 32, 33 (e.g. of four spindle arm sections) each of which can be rotated separately. Furthermore, it is possible to receive the workpiece 2 at the spindle 34 and mount the tool 35 on the rotary table.

LIST OF REFERENCE SIGNS

1 machine tool
2 workpiece
20 machine column
200 receiving surface
21 spindle arm receiving section
211 first subsection of the spindle arm receiving section
212 second subsection of the spindle arm receiving section
213 first braced drive
213A-213D drive elements of the first braced drive
213E driven element of the first braced drive
214 fourth braced drive
214A-214D drive elements of the fourth braced drive
214E driven element of the fourth braced drive
215 first end section of the spindle arm receiving section
216 second end section of the spindle arm receiving section
30 spindle arm
31 first spindle arm section
311 first subsection of the first spindle arm section
312 second subsection of the first spindle arm section
313 second braced drive
313A-313D drive elements of the second braced drive
313E driven element of the second braced drive
315 first end section of the first spindle arm section
316 second end section of the first spindle arm section
317 buffer section
32 second spindle arm section
321 first subsection of the second spindle arm section
322 second subsection of the second spindle arm section
323 third drive
325 first end section of the second spindle arm section
326 second end section of the second spindle arm section
33 third spindle arm section
34 spindle
345 end section of the spindle
35 tool
36 guiding element
361 casing
362 ridge
363 segment
40 numeric control
50 rotary table
51 slide
61 first linear axis
62 second linear axis
70 line
R1 first rotational axis
R2 second rotational axis
R3 third rotational axis
R4 rotational axis of the spindle
R5 rotary table rotational axis

The invention claimed is:
1. A machine tool for machining a workpiece, comprising:
a spindle arm receiving section arranged on a machine column, the spindle arm receiving section including a first subsection and a second subsection that are arranged on the machine column at a distance from each other; and
a spindle arm with a spindle for receiving a tool or the workpiece, the spindle arm being received between the first subsection and the second subsection of the spindle arm receiving section so as to be movably attached to the spindle arm receiving section for positioning the spindle in a processing area, the spindle arm for pivoting the spindle comprising:
  a first spindle arm section, that is designed as a longitudinal element, and is rotatably hinged to the spindle arm receiving section so as to be rotatable about a first rotational axis with respect to the spindle arm receiving section, the first rotational axis extending through a first end section of the spindle arm receiving section and through a first end section of the first spindle arm section;
  a second spindle arm section, that is designed as a longitudinal element, and is rotatably hinged to the first spindle arm section so as to be rotatable about a second rotational axis with respect to the first spindle arm section, the second rotational axis extending through a second end section of the first spindle arm section and through a first end section of the second spindle arm section; and
  a third spindle arm section that serves to receive the spindle, is disposed opposite the second spindle arm section, and is rotatably hinged to the second spindle arm section so as to be rotatable about a third rotational axis, the third rotational axis extending through a second end section of the second spindle arm section,
wherein:
  the first subsection of the spindle arm receiving section has a first braced drive for transmitting a first torque to the first spindle arm section for a rotational movement of the first spindle arm section about the first rotational axis;
  the first spindle arm section comprises a first subsection and a second subsection, which are arranged at a distance from each other to receive the second spindle arm section;
  the first subsection of the first spindle arm section has a second braced drive for transmitting a second torque to the second spindle arm section for a rotational movement of the second spindle arm section about the second rotational axis; and
  the second spindle arm section has a third drive for transmitting a third torque to the third spindle arm section for a rotational movement of the third spindle arm section about the third rotational axis.

2. The machine tool according to claim 1, wherein a distance between the first and second subsections of the spindle arm receiving section is greater than a distance between the first and second subsections of the first spindle arm section by arranging the first end section of the first spindle arm section between the first and second subsections of the spindle arm receiving section.

3. The machine tool according to claim 1, wherein the first braced drive and the second braced drive each have four mechanically braced drive elements and each have one driven element.

4. The machine tool according to claim 3, wherein the four drive elements of the first braced drive are arranged on the spindle arm receiving section along a circular arc with a maximum center angle of 180°; and
  the four drive elements of the second braced drive are arranged on the first spindle arm section uniformly along a circle.

5. The machine tool according to claim 1, wherein:
  the first rotational axis, the second rotational axis and the third rotational axis are oriented parallel to one another, and
  the machine tool further comprises a numeric control, which is designed to control the first braced drive at the spindle arm receiving section, the second braced drive at the first spindle arm section and the third drive at the second spindle arm section in such a way that an end section of the spindle at the third spindle arm section performs a rectangular path in a plane perpendicular to the parallel first, second, and third rotational axes as a result of simultaneous rotational movements of: the first spindle arm section about the first rotational axis, the second spindle arm section about the second rotational axis and the third spindle arm section about the third rotational axis.

6. The machine tool according to claim 1, wherein the first and second braced drives respectively arranged on the spindle arm receiving section and on the first spindle arm section are designed as cycloid gears; and
  the third drive arranged on the second spindle arm section is designed as a cooled torque drive.

7. The machine tool according to claim 1, wherein:
  the spindle arm comprises a guiding element for running lines at a position, at which the second spindle arm section is hinged to the first spindle arm section, and
  the guiding element has a plurality of segments for separately guiding a plurality of lines.

8. The machine tool according to claim 1, further comprising a rotary table at the machine frame, which is rotatable about a rotary table rotational axis and serves to receive the workpiece or the tool.

9. The machine tool according to claim 8, further comprising a first linear axis for receiving the rotary table, wherein the rotary table is movable along the first linear axis and the rotary table rotational axis is oriented at an angle between 0 degrees and 90 degrees in relation to the first linear axis.

10. The machine tool according to claim 1, further comprising a second linear axis for receiving the spindle arm receiving section, wherein the second linear axis is oriented parallel to the first rotational axis and the spindle arm receiving section is movably arranged on the machine column along the second linear axis.

11. The machine tool according to claim 1, wherein the first spindle arm section has a buffer section for stopping a rotational movement of the second spindle arm section in a direction to the first spindle arm section.

12. The machine tool according to claim 1, wherein:
  the machine column has a receiving area for receiving the spindle arm receiving section;
  a top-bottom direction is defined by a direction from a ceiling surface of an installation room for the machine tool to a stand space of the machine tool; and
  the spindle arm receiving section is arranged on the receiving area either above the receiving area or below the receiving area or on a side of the receiving area.

* * * * *